C. A. DEAN.
AUTOMOBILE AXLE CONSTRUCTION.
APPLICATION FILED NOV. 13, 1915.
1,224,449.
Patented May 1, 1917.
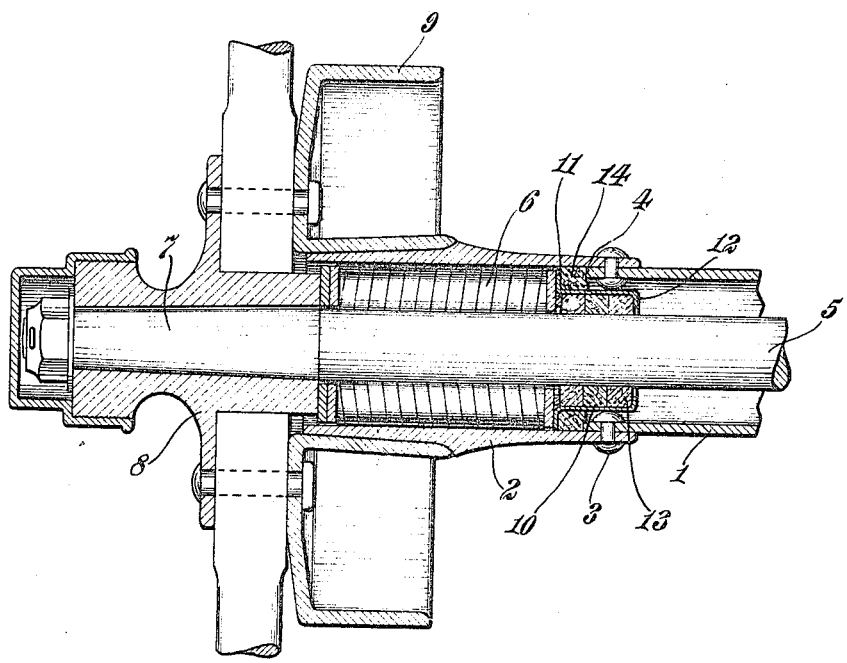
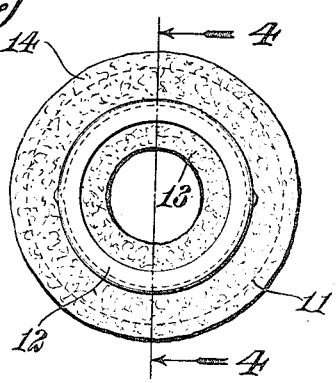
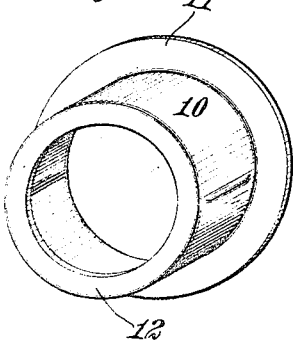
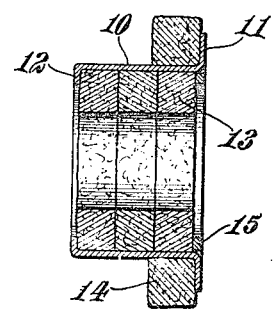
Inventor:
CLARK A. DEAN,
By John H. Bruninga,
His Attorney.

UNITED STATES PATENT OFFICE.

CLARK A. DEAN, OF ST. LOUIS, MISSOURI, ASSIGNOR, BY MESNE ASSIGNMENTS, TO SHURNUFF MANUFACTURING COMPANY, OF ST. LOUIS, MISSOURI, A CORPORATION OF MISSOURI.

AUTOMOBILE-AXLE CONSTRUCTION.

1,224,449. Specification of Letters Patent. Patented May 1, 1917.

Application filed November 13, 1915. Serial No. 61,276.

*To all whom it may concern:*

Be it known that I, CLARK A. DEAN, a citizen of the United States, and residing at St. Louis, in the State of Missouri, have invented a certain new and useful Improvement in Automobile-Axle Construction, of which the following is a specification.

This invention relates to automobiles, and more particularly, to rear axle constructions therefor.

The rear axle of an automobile is inclosed by axle tubes, which tubes extend up to the wheel hubs connected with the axles. In some instances the wheel hubs are supported on the axle, the ends of the axle sections being carried by roller bearings in the ends of the axle tubes, while, in other cases, the wheel hubs have a bearing on the ends of the axle tubes. Since the axle tubes open from the differential casing, and since this casing is filled with a lubricant, the latter will tend to run out of the end of the axle tubes and detract from the appearance of the machine. Where an ordinary felt ring packing is used, the latter soon becomes soggy and softens, so that it will be pressed out of shape and fail to seal the ends of the axle tubes.

One of the objects of this invention, therefore, is to provide an axle construction in which a reinforced packing is provided between the axle and its casing.

Another object is to employ, between the axle and the casing, packing means which comprises a frame and a packing carried by the frame, which will not only keep its shape and effectually seal the casing with respect to the axle, but which is also so constructed that it can be readily applied to existing automobile axle constructions.

Further objects will appear from the detail description taken in connection with the accompanying drawing, in which:

Figure 1 is a vertical longitudinal section through the end of an axle casing and wheel hub, showing the packing embodying this invention;

Fig. 2 is an end view of the packing means;

Fig. 3 is a perspective view of the frame; and,

Fig. 4 is a section on the line 4—4, Fig. 2.

Referring to the accompanying drawing, 1 designates the end of an axle tube which has secured to the end thereof a bearing 2, which in practice is pressed on the axle tube and secured by means of rivets 3, so as to form an interior shoulder 4. This bearing 2 thus forms an extension of the axle tube. The axle tube receives the axle section 5, which is supported in the end of the axle tube by means of a roller bearing 6, and the end 7 of which receives, and is connected with, the hub 8 of the wheel. The wheel has secured thereto the brake drum 9.

Between the axle tube and the axle therein is a packing shown in detail in Figs. 2, 3 and 4. This packing comprises a frame 10, preferably formed of sheet metal and having an outturned flange 11 and an inturned flange 12. Carried inside of the frame is a series of felt packing rings 13, while carried by the outside of the frame is a felt packing ring 14. A metallic bearing ring 15 is adapted to be positioned against the outside packing ring 13, and inside of the frame.

The packing as thus constructed, therefore, provides a unitary structure comprising a frame and packing rings carried by the frame. This packing is arranged to be positioned between the axle and the axle tube, with the outer ring 14 bearing against the shoulder 4 and the flange 11 bearing against the roller bearing cage 6. Since the inner packing rings 13 are retained against endwise movement by the flange 12, they can be considerably compressed so as to closely hug the axle, and the outer packing ring 14 can be similarly compressed on account of the provision of the flange 11, so as to closely hug the inside of the bearing or axle tube extension 2. Moreover, the bearing ring 15 forms a bearing which will abut against the roller bearing cage, so as to hold the inside packing rings tightly compressed. The frame thus forms a connecting link between the packing rings, one of which is mounted in the frame and engages the axle and the other of which is mounted on the frame and engages the axle casing. Endwise pressure on one packing ring will, therefore, operate to spread both rings radially to cause both rings to closely seal the axle with respect to the casing. The frame is of such diameter as to pass inside of the heads of the rivets 3. There is thus provided a packing which will closely seal the axle with respect to the axle tube, so as to prevent oil from passing out of the end thereof. The provision of the frame serves to hold the packing rings in shape and maintain the sealing engagement with the axle and its casing, and these rings can be readily replaced.

It is obvious that various changes may be made in the details of construction without departing from the spirit of this invention. It is, therefore, to be understood that this invention is not to be limited to the specific construction shown and described.

In the claims, the term "felted" is used to describe a packing having the general characteristics of a material which is suitable to be used as a lubricant retaining and sealing material, as distinguished from hard and unyielding, as well as non-absorbent materials, which are simply used to close joints against dust.

Having thus described the invention, what is claimed is:

1. In an automobile, an axle casing, an axle therein, and a lubricant-retaining packing device positioned between the axle and the casing, said packing device comprising felted packing and a frame therefor adapted to maintain said packing in sealing engagement with both the axle and the casing.

2. In an automobile, an axle casing having an end shoulder, an axle therein, a bearing for the axle, and a lubricant-retaining packing device positioned between the axle and the casing and arranged to fit between the shoulder and the bearing, said packing device comprising felted packing and a frame therefor adapted to maintain said packing in sealing engagement with both the axle and the casing.

3. In an automobile axle casing, a lubricant retaining packing device adapted to be positioned between the axle and the casing and comprising, a frame, a felted packing ring in said frame adapted to engage the axle, and a felted packing ring on said frame adapted to engage the casing.

4. In an automobile axle casing, a lubricant retaining packing device adapted to be positioned between the axle and the casing and comprising, a frame, a felted packing ring in said frame adapted to engage the axle, a felted packing ring on said frame adapted to engage the casing, and means for retaining said packing rings with respect to said frame.

5. In an automobile axle casing, a lubricant retaining packing device adapted to be positioned between the axle and the casing and comprising, a frame, a felted packing ring in said frame adapted to engage the axle, and a felted packing ring on said frame adapted to engage the casing, said frame having flanges adapted to engage said rings.

6. In an automobile axle casing, a lubricant retaining packing device adapted to be positioned between the axle and the casing and comprising, a frame, a felted packing ring in said frame adapted to engage the axle, a felted packing ring on said frame adapted to engage the casing, and a bearing ring engaging one of said packing rings.

7. In an automobile, an axle casing, an axle therein, and a lubricant-retaining packing device between the axle and casing comprising a frame, a felted packing ring in said frame compressed to engage the axle, and a felted packing ring on said frame compressed to engage the casing.

8. In an automobile, an axle casing having an end shoulder, an axle therein, a bearing between said axle and said casing, and a lubricant-retaining packing device between said axle and said casing comprising, a frame, a felted packing ring between said shoulder and said frame and compressed to engage said casing, and a felted packing ring between said bearing and said frame and compressed to engage said axle.

In testimony whereof I affix my signature this 16 day of October, 1915.

CLARK A. DEAN.